(12) United States Patent
Serrano et al.

(10) Patent No.: US 8,522,576 B2
(45) Date of Patent: *Sep. 3, 2013

(54) GLASS SHEET BENDING STATION

(75) Inventors: Alfredo Serrano, Maumee, OH (US);
Gilbert L. Reed, Tuscon, AR (US);
Thomas J. Zalesak, Rossford, OH (US);
Paul D. Ducat, Perrysburg, OH (US)

(73) Assignee: Glasstech, Inc., Perrysburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/566,576

(22) Filed: Aug. 3, 2012

(65) Prior Publication Data

US 2012/0297835 A1 Nov. 29, 2012

Related U.S. Application Data

(60) Division of application No. 11/912,548, filed as application No. PCT/US2006/014725 on Apr. 19, 2006, which is a continuation of application No. 11/128,450, filed on May 13, 2005, now Pat. No. 7,162,893.

(51) Int. Cl.
*C03B 23/03* (2006.01)
*C03B 23/02* (2006.01)

(52) U.S. Cl.
USPC .................. 65/290; 65/106; 65/287; 65/291

(58) Field of Classification Search
USPC ............................ 65/106, 287, 290, 291, 253
See application file for complete search history.

(56) References Cited

U.S. PATENT DOCUMENTS

| D138,277 S | 7/1944 | Berkow |
| D176,182 S | 11/1955 | Gesswein |
| D177,711 S | 5/1956 | Blumberg |
| 2,924,485 A | 2/1960 | Miles |

(Continued)

FOREIGN PATENT DOCUMENTS

| DE | 19642876 C1 | 1/1998 |
| EP | 0123119 A2 | 10/1984 |

(Continued)

OTHER PUBLICATIONS

Russian Decision on Grant Patent for Invention—Dated Mar. 31, 2010, Application No. 2071465 11/03.

(Continued)

*Primary Examiner* — Jason L. Lazorcik
(74) *Attorney, Agent, or Firm* — Brooks Kushman P.C.

(57) ABSTRACT

A glass sheet bending station includes a framework, lower and upper deformable molds for receiving therebetween a glass sheet to be bent, and lower and upper linkages that respectively support the lower and upper molds on the framework. Each linkage includes connector links that are fixedly connected to the associated mold and that have pivotal connections to each other, wherein the pivotal connections define pivot axes that are parallel to a shape defined by the connector links between the lower and upper linkages throughout the bending. Each linkage also has control links connected to the connector links thereof such that the control links are pivotable about axes that extend perpendicular to the shape defined between the lower and upper. Furthermore, at least one of the control links of each linkage is configured to permit glass sheet bending by linkage movement on one side thereof independently of the other side thereof.

13 Claims, 14 Drawing Sheets

(56) References Cited

U.S. PATENT DOCUMENTS

| | | | |
|---|---|---|---|
| 3,346,358 A | | 10/1967 | Thomas |
| 3,356,480 A | | 12/1967 | Golightly |
| 3,460,928 A | | 8/1969 | Casko |
| 3,582,304 A | | 6/1971 | Bognar |
| 3,701,644 A | | 10/1972 | Frank |
| 3,854,920 A | | 12/1974 | Kay et al. |
| 4,540,425 A | | 9/1985 | Bocelli et al. |
| 4,556,406 A | | 12/1985 | Kahle |
| 4,661,139 A | | 4/1987 | Reese et al. |
| 4,711,653 A | | 12/1987 | Frank et al. |
| 4,822,398 A | * | 4/1989 | McMaster et al. ............... 65/273 |
| 4,828,598 A | | 5/1989 | Imamura et al. |
| 4,853,018 A | | 8/1989 | Koss et al. |
| 4,881,962 A | * | 11/1989 | Reunamaki et al. ............ 65/104 |
| 4,883,527 A | * | 11/1989 | McMaster et al. ............... 65/273 |
| 4,909,824 A | * | 3/1990 | McMaster et al. ............... 65/273 |
| 4,957,531 A | * | 9/1990 | McMaster et al. ............... 65/273 |
| 4,966,618 A | * | 10/1990 | Letemps et al. ................ 65/106 |
| 5,009,693 A | * | 4/1991 | Freidel et al. .................... 65/107 |
| 5,022,906 A | | 6/1991 | Vanaschen et al. |
| 5,057,137 A | * | 10/1991 | Reunamaki et al. ............ 65/104 |
| 5,069,705 A | * | 12/1991 | Letemps et al. ................ 65/289 |
| 5,090,986 A | * | 2/1992 | Zalesak ............................ 65/104 |
| 5,094,679 A | * | 3/1992 | Letemps et al. ................ 65/289 |
| 5,118,334 A | | 6/1992 | Freidel et al. |
| 5,201,928 A | * | 4/1993 | Dicks et al. ..................... 65/106 |
| 5,236,487 A | | 8/1993 | Letemps et al. |
| 5,368,625 A | * | 11/1994 | Mizusugi ......................... 65/273 |
| 5,383,990 A | | 1/1995 | Tsuji |
| 5,484,657 A | | 1/1996 | Kramling et al. |
| 5,498,275 A | * | 3/1996 | Reunamaki ..................... 65/268 |
| 5,556,444 A | * | 9/1996 | Reunamaki ..................... 65/106 |
| 5,697,999 A | * | 12/1997 | Reunamaki ..................... 65/106 |
| 5,928,398 A | | 7/1999 | Lehto |
| 5,970,745 A | | 10/1999 | Lehto |
| 6,192,710 B1 | | 2/2001 | Takeda et al. |
| 6,378,339 B1 | * | 4/2002 | Zalesak et al. .................. 65/104 |
| 6,578,383 B2 | | 6/2003 | Bennett et al. |
| 6,901,774 B2 | * | 6/2005 | Maeda ............................. 65/348 |
| 7,086,252 B2 | * | 8/2006 | McMaster ....................... 65/106 |
| 7,162,893 B2 | * | 1/2007 | Serrano et al. .................. 65/106 |
| 7,228,717 B2 | * | 6/2007 | Zalesak et al. .................. 65/275 |
| 7,316,131 B2 | * | 1/2008 | Maeda et al. ................... 65/114 |
| D607,387 S | | 1/2010 | Golden et al. |
| 2004/0216489 A1 | * | 11/2004 | Maeda et al. ................... 65/114 |
| 2006/0254317 A1 | * | 11/2006 | Serrano et al. .................. 65/291 |
| 2008/0260999 A1 | * | 10/2008 | Serrano et al. ................. 428/174 |
| 2010/0287989 A1 | | 11/2010 | Tetlow et al. |
| 2011/0020611 A1 | | 1/2011 | Ando et al. |
| 2011/0247367 A1 | * | 10/2011 | Nitschke et al. ................ 65/287 |
| 2012/0297835 A1 | * | 11/2012 | Serrano et al. .................. 65/290 |

FOREIGN PATENT DOCUMENTS

| | | |
|---|---|---|
| JP | 07172855 A2 | 7/1995 |
| JP | 08511759 A | 12/1996 |
| JP | 2000169167 A | 6/2000 |
| JP | 2002029765 A2 | 1/2002 |
| JP | 2004536012 A | 12/2004 |
| SU | 1079614 A | 3/1983 |
| WO | 9855412 A1 | 12/1998 |
| WO | 03010100 A1 | 2/2003 |

OTHER PUBLICATIONS

JP Notice of Reasons for Rejections Dated Mar. 5, 2013, Application No. P2008-511133, Dispatch No. 130879, 3 pages.

* cited by examiner

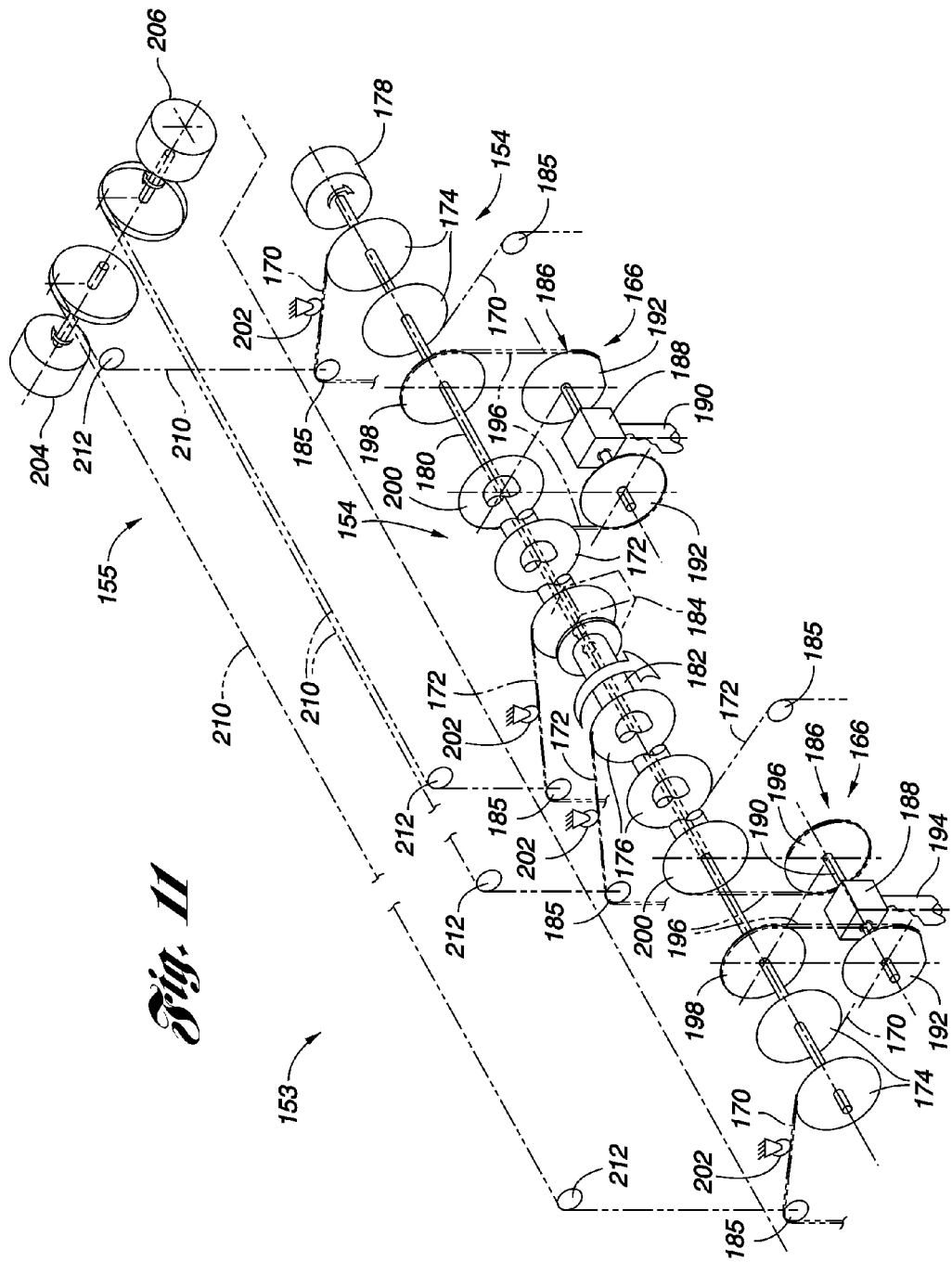

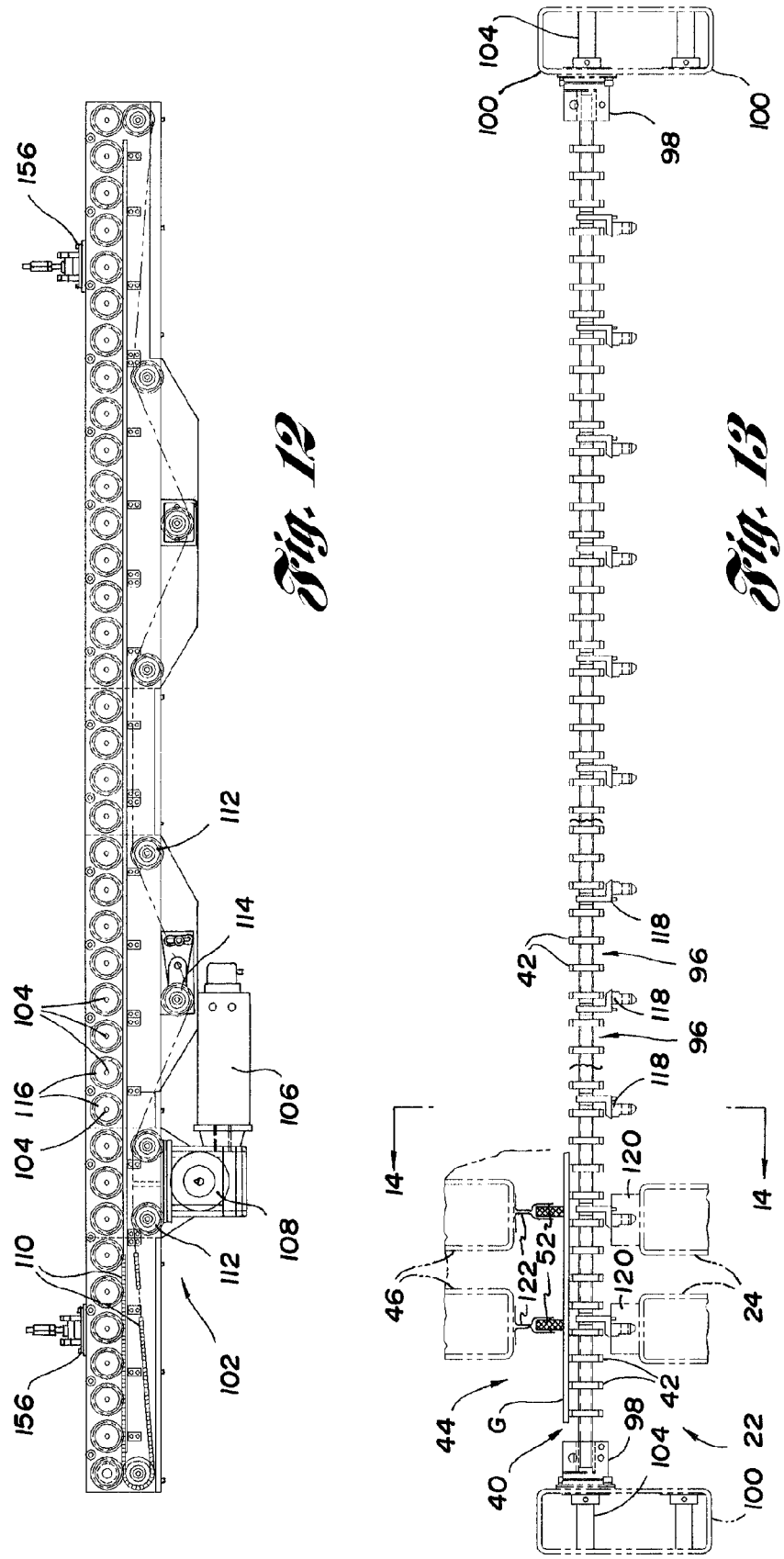

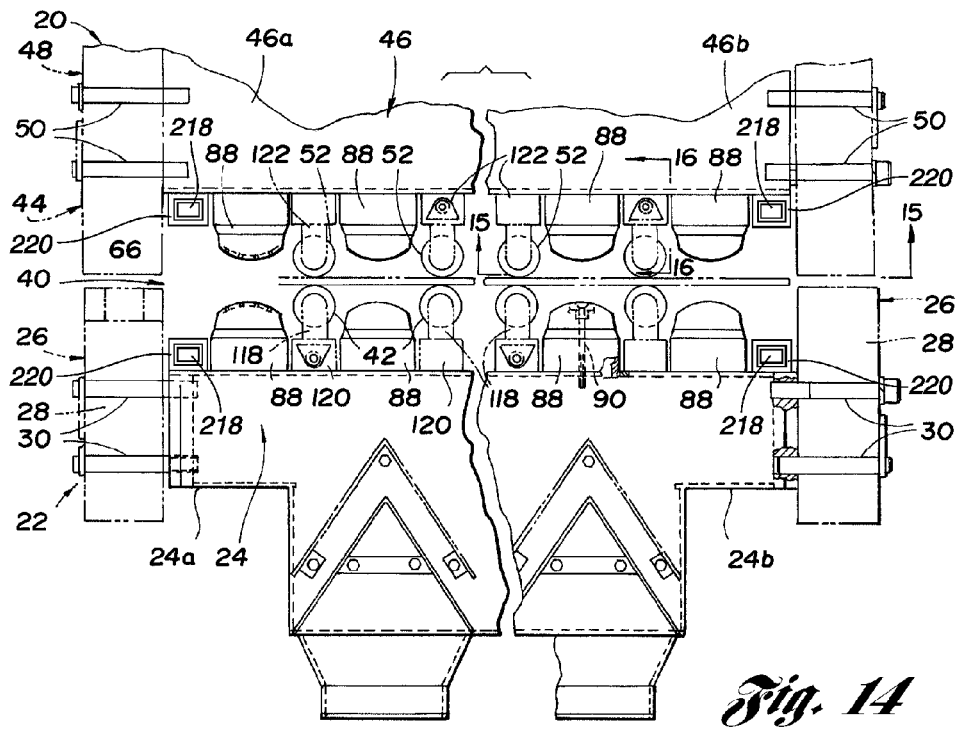
Fig. 14
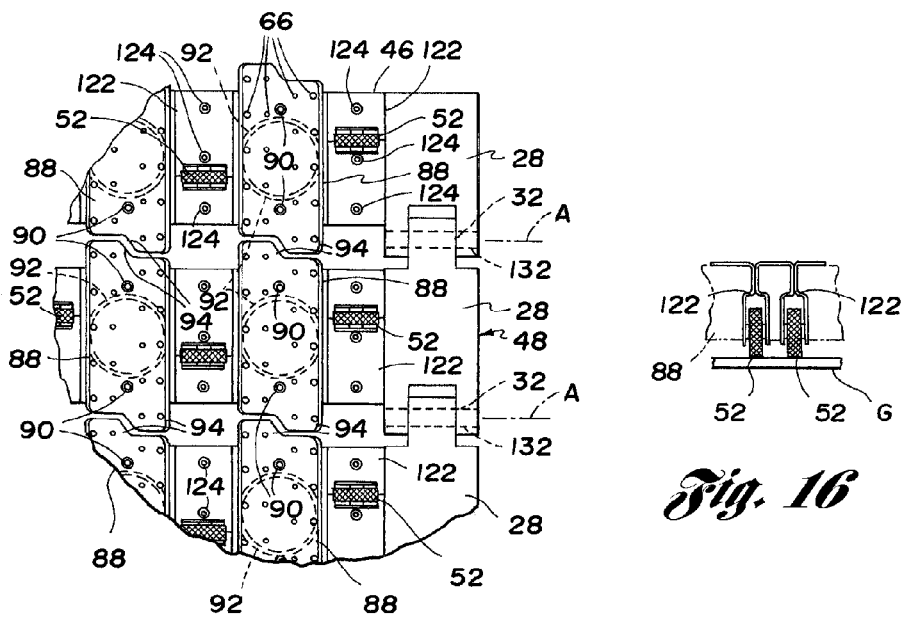
Fig. 15
Fig. 16

GLASS SHEET BENDING STATION

CROSS-REFERENCE TO RELATED APPLICATIONS

This application is a division of U.S. application Ser. No. 11/912,548, filed Jun. 17, 2008, which is the U.S. national phase of PCT Application Serial No. PCT/US2006/014725, filed Apr. 19, 2006, which is a continuation of U.S. application Ser. No. 11/128,450, filed May 13, 2005, now U.S. Pat. No. 7,162,893, issued Jan. 16, 2007, which are all hereby incorporated by reference in their entirety.

TECHNICAL FIELD

This disclosure relates to a bending station for bending glass.

BACKGROUND

Glass sheet bending to a constant radius of curvature has previously been provided as disclosed by U.S. Pat. No. 5,498,275 Reunamacki, U.S. Pat. No. 5,556,444 Reunamacki, and U.S. Pat. No. 5,697,999 Reunamacki all of which are assigned to the assignee of the present invention.

SUMMARY

A glass sheet bending station, according to the present disclosure, for bending heated glass sheets includes a framework, lower and upper deformable molds for receiving therebetween a glass sheet to be bent, and lower and upper linkages that respectively support the lower and upper deformable molds on the framework. The lower and upper linkages are configured to respectively control movement of the lower and upper deformable molds from a first shape to a second bent shape. Each linkage includes connector links that are fixedly connected to the associated deformable mold and that have pivotal connections to each other, wherein the pivotal connections define pivot axes that are parallel to a shape defined by the connector links between the lower and upper linkages throughout the bending. Each linkage also has control links that have respective pivotal connections to the connector links thereof such that the control links are pivotable about axes that extend perpendicular to the shape defined between the lower and upper linkages throughout the bending. Furthermore, at least one of the control links of each linkage is configured to permit glass sheet bending by linkage movement on one side thereof independently of the other side thereof. The bending station further includes an actuating mechanism that is operable to move each linkage on the one side of the associated at least one control link to provide bending of the glass sheet independently of the other side of the at least one control link.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 11 is a schematic view illustrating an actuating mechanism that includes a primary actuating mechanism and a secondary actuating mechanism for moving the linkages to perform the different modes of bending;

FIG. 11d is another view similar to FIG. 11b but showing the lower linkage bent with a J shape similar to the bending also shown in FIG. 3a;

FIG. 12 is a side elevational view taken along the direction of line 12-12 in FIG. 2 to illustrate a drive mechanism that drives rotatable conveying elements of the lower deformable mold;

FIG. 13 is a longitudinal view taken along the direction of line 13-13 in FIG. 1 to illustrate the manner in which the glass sheet is positioned between the lower and upper deformable molds;

FIG. 14 is a side elevational view taken in the direction of line 14-14 in FIG. 13 to further illustrate the manner in which the glass sheet is supported between the lower and upper deformable molds;

FIG. 15 is a bottom plan view taken along the direction of line 15-15 in FIG. 14 to further illustrate quench plenums of the deformable molds; and FIG. 16 is taken along the direction of line 16-16 in FIG. 14 through the upper deformable mold and illustrates the positioning of rotatable conveyor elements that engage the glass sheet during the bending.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1-5 of the drawings, glass sheet bending apparatus includes a bending station generally indicated by 20 and is operable to perform the method of the invention upon receiving a heated glass sheet to be bent from an unshown furnace which may be of any conventional construction. The bending station 20 ultimately delivers a bent glass sheet according to the invention to an unshown delivery apparatus which may be of any suitable construction. As shown by the drawings and hereinafter described, the bending by bending station 20 starts with a heated flat glass sheet and is performed to provide a bent shape of a constant radius or other bent shape as is hereinafter described.

Figure 1:
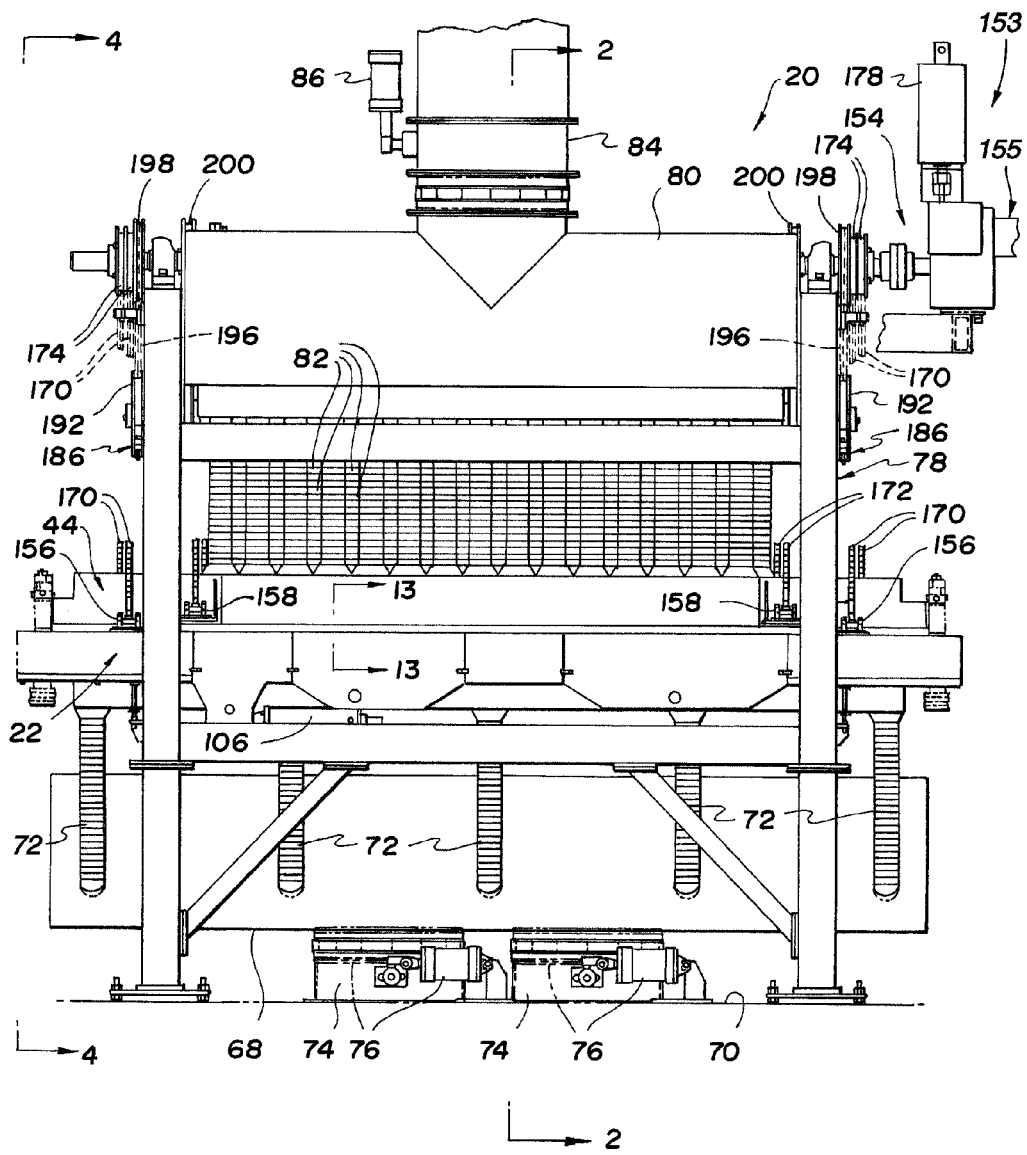
FIG. 1 is a side elevational view of glass sheet bending apparatus including a bending station.
Figure 2:
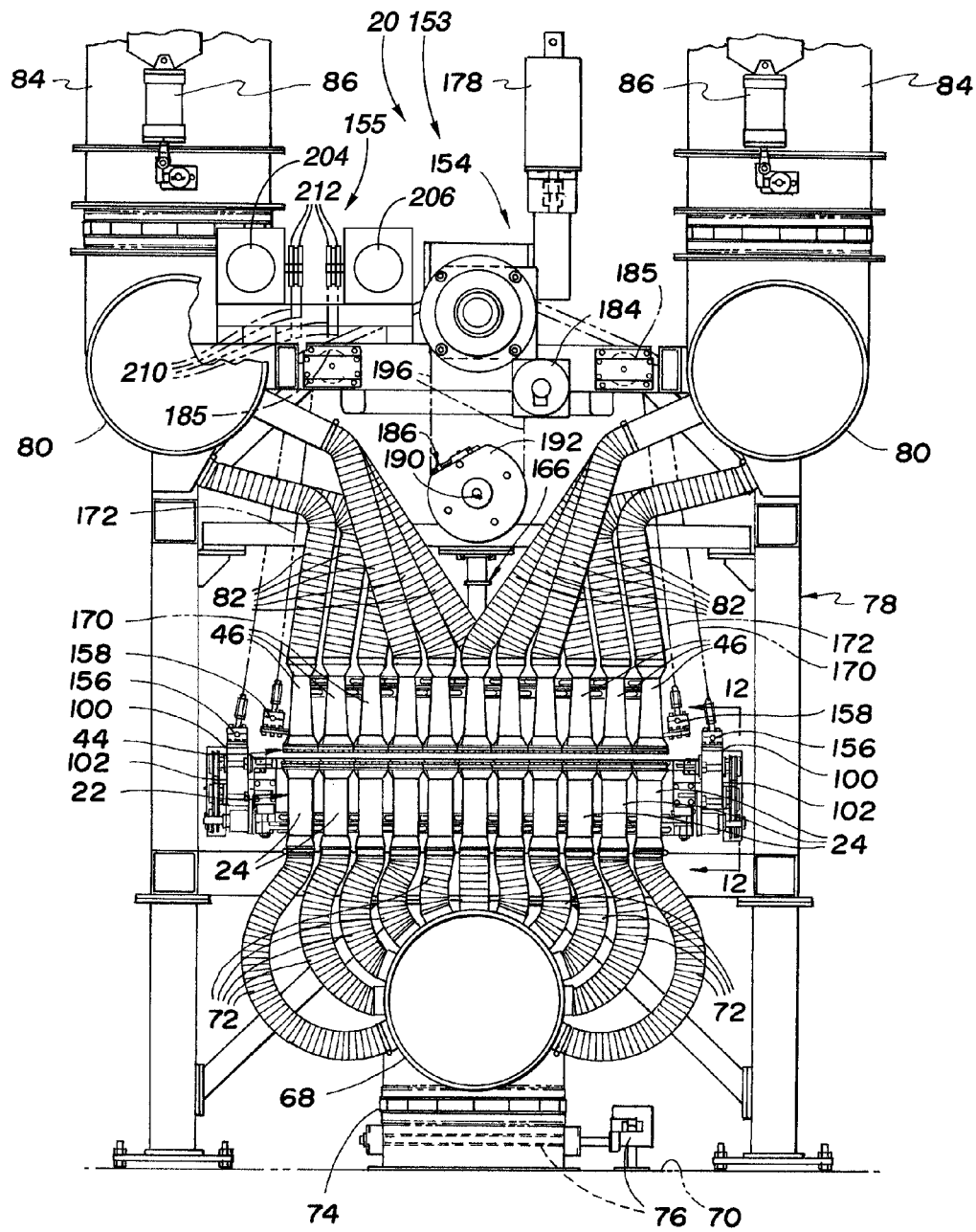
FIG. 2 is an end elevational view taken through the bending station along line 2-2 in FIG. 1 and is illustrated with the deformable molds of the bending station in a flat shape prior to the bending cycle.
Figure 6:
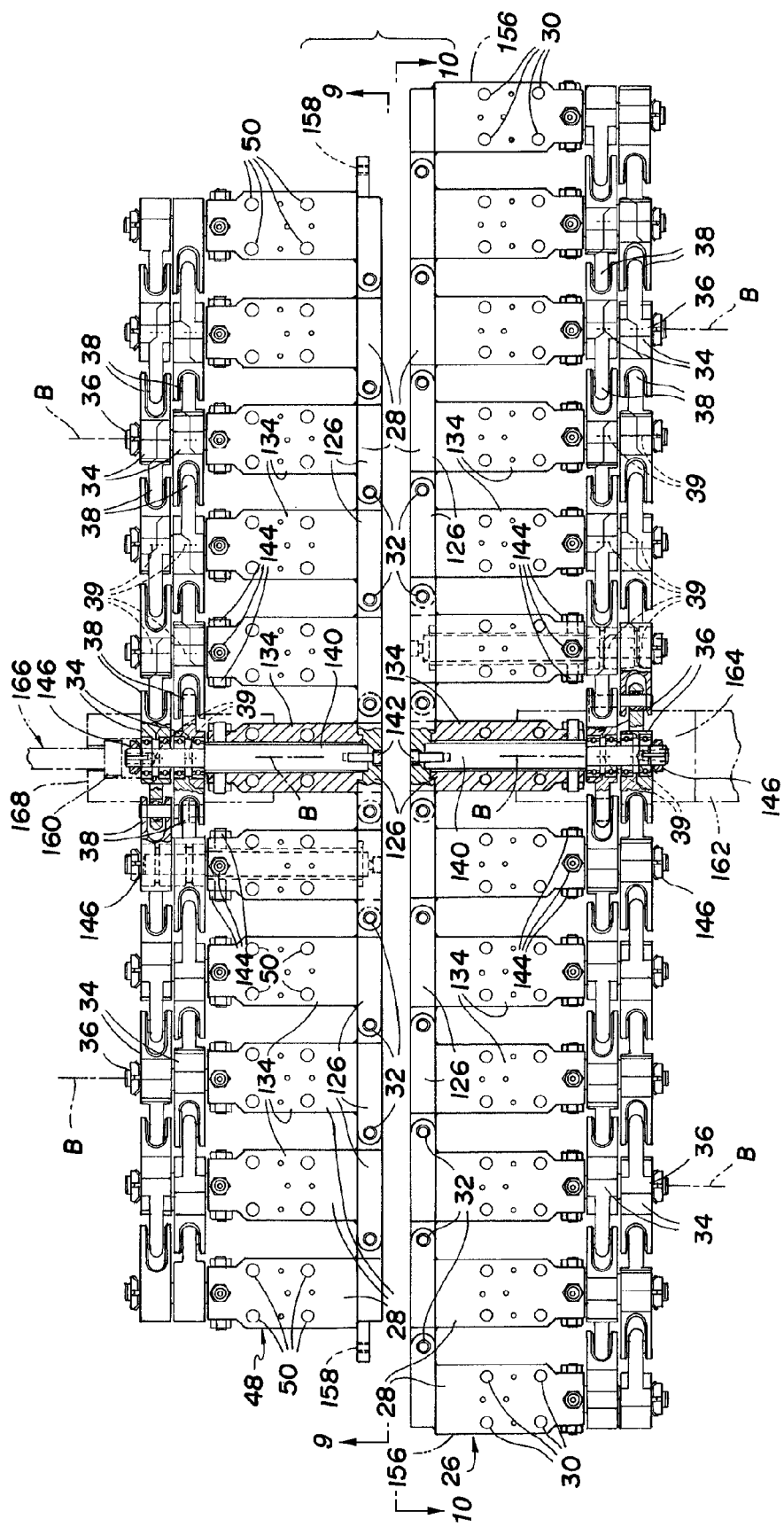
FIG. 6 is an enlarged view taken in the same direction as FIG. 4 and illustrates the constructions of the linkages that control the movement of the deformable molds.
Figure 7:
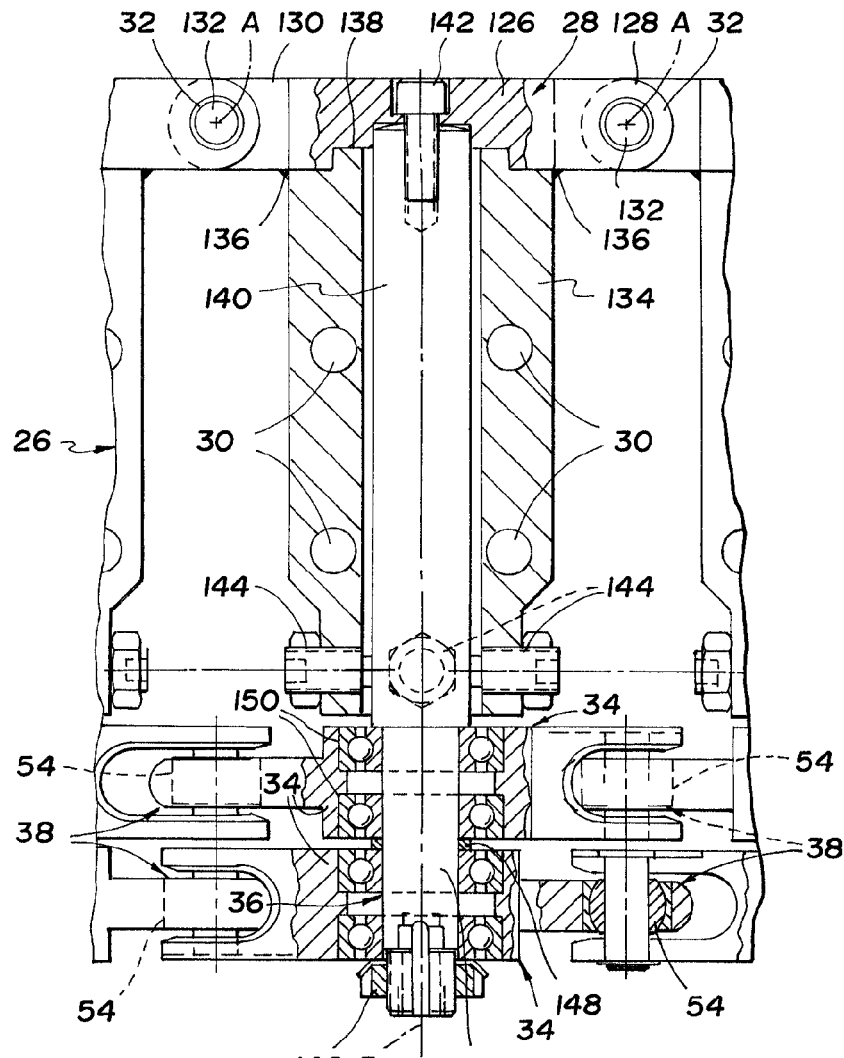
FIG. 7 is a further enlarged view taken partially in section to illustrate the construction of connector links and control links at the left side of each linkage as shown in FIG. 6.
Figure 8:
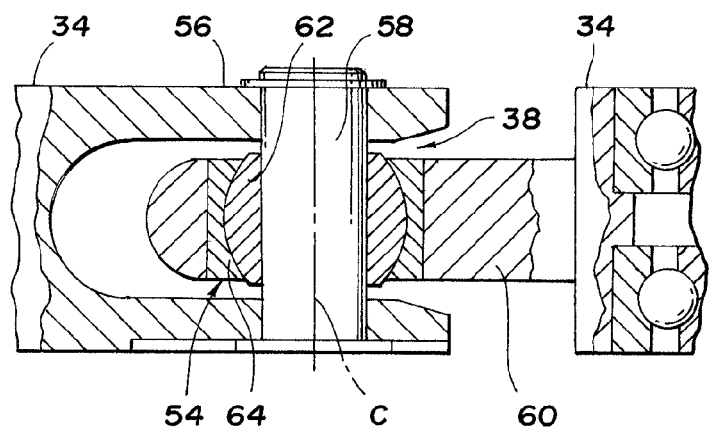
FIG. 8 is a still further enlarged partial view of the linkage illustrating the manner in which the control links thereof are connected to each other by universal connections that are preferably embodied by spherical bearings.

With continuing reference to FIGS. 1-5, bending station 20 includes a lower deformable mold 22 having a plurality of mold members 24 that are movable with respect to each other to bend the glass sheet. A linkage 26 illustrated in FIG. 4 extends between the mold members to control movement thereof with respect to each other. The linkage 26 includes connector links 28 that are fixedly connected to the mold members 24 by connections 30 illustrated in FIG. 14. Connector links 28 also have pivotal connections 32 through each other as shown in FIGS. 6, 7 and 10. These pivotal connections 32 have axes A that extend parallel to the glass sheet while flat as in FIG. 2 and throughout the bending thereof such as to the bent shape illustrated in FIGS. 3, 3a, 11b, 11c, 11d and 11e. The linkage 26 also includes control links 34 which, as illustrated in FIGS. 6, 7, 9 and 10 have respective pivotal connections 36 to the connector links 28 in a spaced relationship from the pivotal connections 32. The pivotal connections 36 of the control links 34 to the connector links 28 are about axes B (FIGS. 7 and 7a) that extend perpendicular to the glass sheet while flat as illustrated in FIG. 2 and throughout the bending thereof such as to the bent shape shown in FIGS. 3, 3a, 11b, 11c, 11d and 11e. These control links 34 as best illustrated in FIGS. 7 and 8 have universal connections 38 to each other such that the linkage 26 moves the mold members 24 to bend the glass sheet with a constant radius of curvature. More specifically with reference to FIG. 7, the pivoting of the connector links 28 to which the mold members are fixed is controlled about their associated pivotal axes A by the pivoting of the control links 34 about their associated pivotal connection axes B to the connector links, and the universal connections 34 permit this pivoting about axes B as well as about associated axes C (FIGS. 7 and 8) parallel to axes A. As shown schematically in FIG. 6, and as is hereinafter more fully described in connection with FIGS. 7a and 7b, the lower linkage 26 has at least one control link detachable connection 39 that is detachable to permit glass sheet bending by linkage movement on one side thereof independently of linkage movement on the other side thereof. As illustrated, there are a plurality of the control link detachable connections 39 at the center of lower linkage 26 and to its right which accommodates for different shapes to be bent as is hereinafter described.

As best illustrated by FIGS. 13 and 14, the deformable mold 22 is embodied by a horizontal conveyor 40 having rotatable conveying elements 42 supported by the mold members 24 to support and convey the glass sheet G for horizontal movement while flat and during the bending.

With further reference to FIGS. 1-5, the bending station 20 also includes an upper deformable mold 44 that cooperates with the lower deformable mold 22 in an opposed relationship and has a plurality of mold members 46 that engage the glass sheet and are movable with respect to each other to bend the glass sheet. The upper deformable mold 44 includes a linkage 48 that extends between the mold members 46 thereof to control movement thereof with respect to each other with substantially the same construction as the previously described lower linkage 26. More specifically, the upper linkage 48 includes connector links 28 fixedly connected such as by connections 50 shown in FIG. 14 to the mold members 46 thereof and also have pivotal connections 32 to each other about axes A that extend parallel to the glass sheet while flat and during the bending. The upper linkage 48 like the lower linkage 26 also has control links 34 having pivotal connections 36 to the connector links about axes B that extend perpendicular to the glass sheet while flat as in FIG. 2 and during bending such as to the bent shapes shown in FIGS. 3, 3a, 11b, 11c, 11d and 11e. The control links 34 of the upper linkage 48 like the lower linkage 26 have universal connections 38 to each other. This construction of the upper linkage 48 moves the mold members 46 of the upper deformable mold 44 in generally the same manner as the lower deformable mold and linkage described above to provide bending to the constant radius curved shape in cooperation with the lower deformable mold or to other bend shapes such as shown in FIGS. 3a, 11b, 11c, 11d and 11e. The upper deformable mold 44 like the lower deformable mold 22 has its linkage 48 provided with at least one and, as illustrated schematically in FIG. 6, actually with a plurality of control link detachable connections 39 that are detachable to permit glass sheet bending by linkage movement on one side thereof independently of linkage movement on the other side thereof in the same way previously described above in connection with the lower linkage 26. More specifically, the upper linkage 48 like the lower linkage has a center control link detachable connection 39 and a plurality of these control link detachable connection 39 to the right thereof just like the lower linkage 26. Provision of a plurality of the control link detachable connections 39 as previously discussed in connection with the lower linkage 26 allows glass sheets of different sizes to be bent to different bent shapes.

As previously described, the lower deformable mold 22 is illustrated as being embodied by a horizontal conveyor 40 whose rotatable conveying elements 42 are supported by the mold members 24 thereof to support and convey the glass sheet for horizontal movement while flat and during the bending. The upper deformable mold 44 is embodied as an upper deformable mold located above the lower deformable mold that conveys the glass sheet in an opposed relationship. The upper deformable mold has its mold members 46 provided with rotatable elements 52 that engage the glass sheet. Movement of the mold members 46 under the control of linkage 48 in a generally similar manner to the previously described first linkage 26 causes the bending of the glass sheet G to a constant radius curved shape in cooperation with the lower deformable mold or to other bend shapes permitted by the control link detachable connections 39 as shown in FIGS. 3a, 11b, 11c, 11d and 11e.

Figure 9:
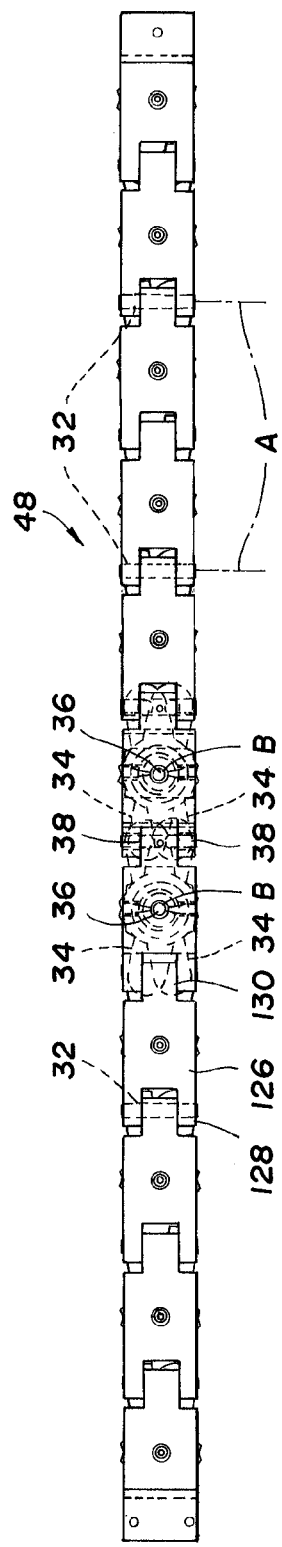
FIG. 9 is a bottom plan view of the upper linkage taken along the direction of line 9-9 in FIG. 6 to show the control links thereof pivoted toward alignment with each other but shown without the detachable connections on the right side.
Figure 10:
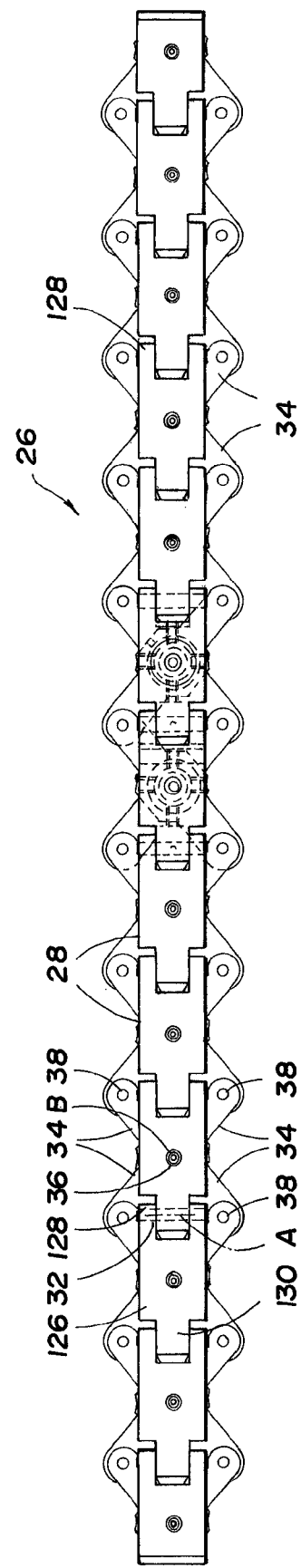
FIG. 10 is a top plan view of the lower linkage taken along the direction of line 10-10 in FIG. 6 to show the control links thereof pivoted farther out of alignment with each other in an X shape but shown without the detachable connections on the right side.

As illustrated in FIGS. 9 and 10, each of the connector links 28 has a pair of the control links 34 pivotally mounted thereon in an X shape. Such a construction reduces the loading on the pivotal connections 32 between the connector links to thereby provide a more rigid construction. Furthermore, as illustrated in FIGS. 7 and 8, the universal connections 38 between the control links 34 are illustrated as being constructed as spherical bearings 54. More specifically, each control link has a forked end 56 that mounts a pin 58 and also has another end 60 that is received by the forked end 56 of the adjacent control link. Each pin 58 mounts the inner spherical bearing element 62 with respect to the associated control link forked end 56, while each control link end 60 mounts the outer spherical bearing element 64. The engaged spherical surfaces of the inner and outer elements 62 and 64 thus provide the pivoting as previously described. Each connector link 28 thus has a pair of the control links 34 mounted thereon in an X shape with the control links connected to each other by these spherical bearings 54. While other universal type connections could be utilized, the use of spherical bearings in association with the pair of control links 34 in the X shape provides accurate control of the linkage movement with a relatively economical construction that can be readily assembled.

As the lower and upper deformable molds 22 and 44 move from the flat shape of FIG. 2 to a bent shape, the lower linkage 26 that controls movement of the lower deformable mold is lengthened while the upper linkage 48 that controls movement of the upper deformable mold is shortened. As such, the lower linkage 26 is constructed as shown in FIG. 10 so that its control links 34 move inwardly from the X shape to a more straightened shape as the bending proceeds and move outwardly from the more straightened shape to the X shape upon movement back to the flat shape in preparation for the next cycle. On the other hand, the upper linkage 48 that controls movement of the upper deformable mold has its control links 34 moved from a more straightened configuration outwardly to a greater X shape as the bending proceeds, and these control links 34 pivot inwardly to a lesser X shape as the second deformable mold is moved back to the flat shape in preparation for the next cycle.

Figure 3:
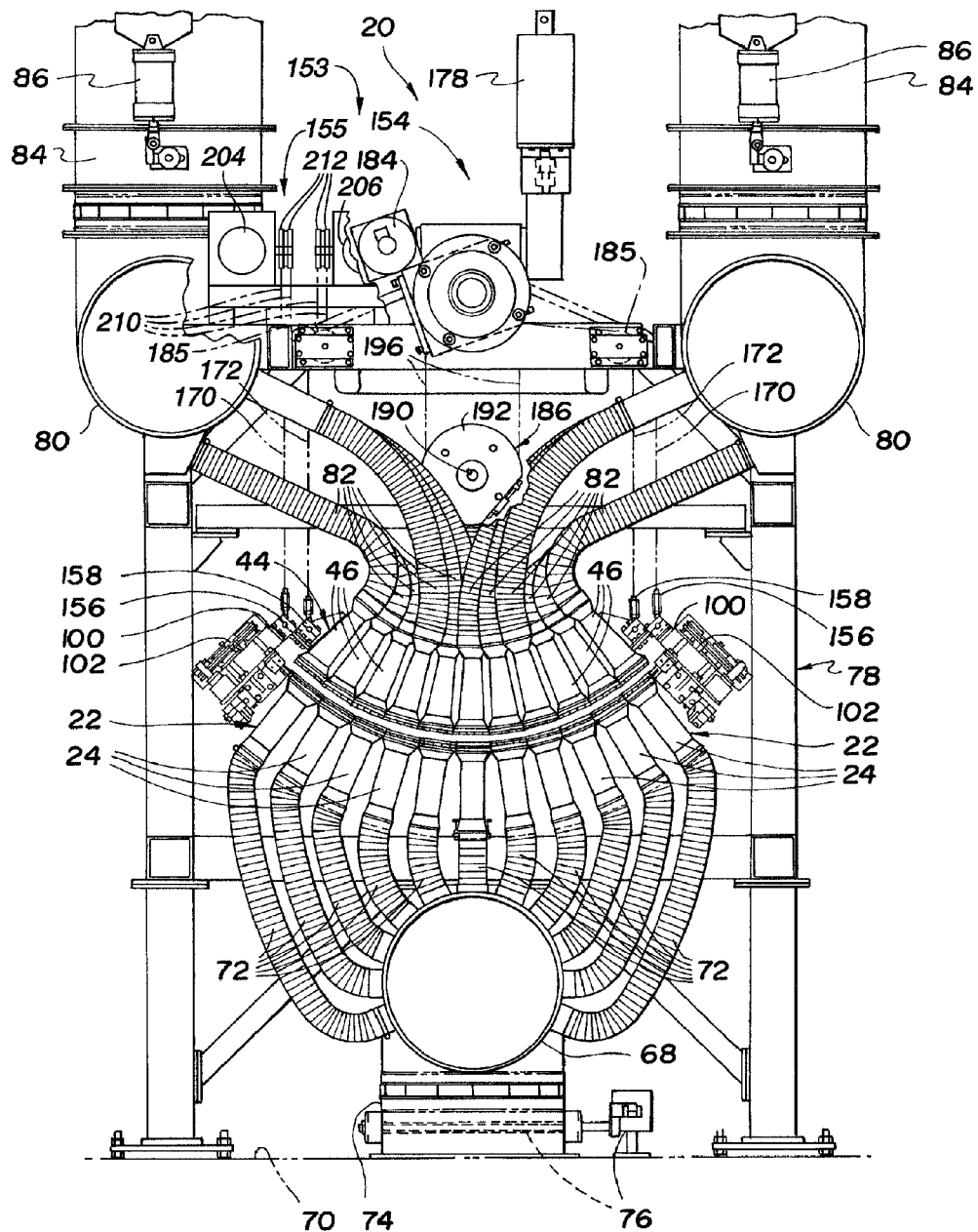
FIG. 3 is an end elevational view similar to FIG. 2 but shown after the deformable molds of the bending station have been moved to a bent shape of a constant radius.

As illustrated by FIGS. 1, 2 and 14, the mold members 24 and 46 of the lower and upper deformable molds 22 and 44 each have an elongated shape including opposite ends 24a, 24b and 46a, 46b (FIG. 14). The linkages 26 and 48 of the lower and upper deformable molds 22 and 44 have the fixed connections 30 and 50 previously described to adjacent ends 24a and 46a to the respective mold members 24 and 46 at adjacent ends 24a and 46a. The lower and upper deformable molds 22 and 44 each have another lower and upper linkage 26 and 48 of the same construction as the previously discussed linkages and having fixed connections 30 and 50 to the respective mold members 24 and 46 at the opposite adjacent ends 24b and 46b as the other linkages. Each elongated mold member 24 and 46 is constructed as a quench tube having quench openings 66 (FIG. 15) through which quenching gas is supplied to quench the glass sheet after the bending such as for heat strengthening or tempering. More specifically as illustrated in FIGS. 1, 2 and 3, an elongated quench duct 68 is mounted on the factory floor 70 and has a round cross-section from which flexible quench conduits 72 extend along spaced locations to each of the elongated lower quench tubes 24. Pressurized quench air is supplied through supply ducts 74 to the lower quench duct 68 under the control of associated dampers 76 such that the pressurized quenching gas can be fed through the flexible ducts 72 to the lower side of the bent glass sheet.

With continuing reference to FIGS. 1-3, a framework 78 of the bending and quenching bending station supports a pair of upper quench ducts 80 that have elongated shapes with round cross-sections like the lower quench duct 68 mounted on the factory floor as described above. Flexible quench conduits 82 connect the upper quench ducts 80 at spaced locations along the length of the bending station with each of the upper quench tubes 46 of the upper deformable mold 44. Supply ducts 84 controlled by associated dampers 86 supply quenching gas to the upper quench ducts 80 for flow through the flexible quench conduits 82 to the elongated upper quench tubes 46 and eventual flow through the quench openings thereof to quench the upper surface of the bent glass sheet in cooperation with the quenching gas supplied to the lower surface thereof by the quench tubes 24 of the lower deformable mold as described above.

As illustrated in FIGS. 14 and 15, each quench tube 24 and 46 includes quench plenums 88 mounted thereon with the rotatable elements 42 and 52 of the respective deformable molds 22 and 44 mounted on the quench tubes between the quench plenums. Each quench plenum 88 actually has a one-piece cast aluminum construction but as shown has a two-piece cast aluminum construction which is secured by connectors 90 such that a round inlet 92 (FIG. 15) of each quench plenum supplies the quenching gas from the associated quench tube to its quench openings 66. Quench plenums 88 also have ends 94 that interfit with the quench openings 66 positioned and oriented to provide a uniform distribution of the quenching gas that quenches the glass sheet after the bending.

With reference to FIG. 13, the lower deformable mold 22 includes a plurality of deformable drive shafts 96 positioned along its length. These deformable drive shafts 96 support the rotatable conveyor elements 42 of the lower deformable mold 22 and may be constructed of a suitable plastic with a cross-section that provides driving engagement with openings through the conveyor elements 42. Opposite ends of each drive shaft 96 are received by drive journals 98 mounted on a pair of laterally spaced mold mounting members 100 respectively located on the opposite lateral sides of the lower deformable mold. As illustrated by combined reference to FIGS. 4 and 12, each mounting member 100 of the lower deformable mold has a drive mechanism 102 mounted thereon to drive the adjacent ends 104 (FIG. 13) of the deformable drive shafts 96. This driving is performed by an electric motor 106 whose output 108 drives a continuous chain 110 that is received by idler sprockets 112, a tension adjuster socket 114 and drive sprockets 116 connected to the ends 104 of the deformable drive shafts. This driving of the drive shafts 96 is performed as the flat glass sheet is received between the lower and upper deformable molds 22 and 44 as illustrated in FIG. 2 and while being bent and after the bending during the quenching to provide heat strengthening or tempering as previously described.

It should be noted that the deformable drive shafts 96 as illustrated in FIG. 13 have L-shaped journals 118 whose orientation is preferably switched along the direction of conveyance from one drive shaft to the next so that the conveyor elements 42 engage the glass sheet at different locations in order to prevent strip marking of the glass sheet being bent. These journals 118 are supported by mounts 120 on the lower quench tubes 24 and receive the deformable drive shaft between adjacent conveyor elements 42 with tubular spacers spacing the conveyor elements from each other and from the journals 118. More specifically, the central drive shaft extends through the tubular spacers as well as through the drive openings of the conveyor elements 42 as previously described to provide the driving with the spacers locating the conveyor elements with respect to each other and with respect to the journals 118. Furthermore, it should be noted that each conveyor element 42 as well as the rotatable elements 52 of the upper deformable mold has an outer annular ring of an aromatic polyamide fiber such as Kevlar that engages the glass sheet.

The rotatable elements 52 of the upper deformable mold are actually mounted on deformable but undriven shafts like the ones shown in FIG. 12 on the lower deformable mold. However, as shown in FIGS. 13, 15 and 16, the rotatable elements 52 of the upper deformable mold can also each be rotatably mounted by an unsymmetrical journal 122 that is secured to the associated upper quench tube 46 by fasteners 124 with alternate positioning along the direction of conveyance from one rotatable element to the next so that, as with the conveyor elements 42 of the lower deformable mold, there is no strip marking of the heated glass sheet due to engagement only at one location.

As shown in FIG. 14, the lower and upper rollers 42 and 52 are in a vertically aligned relationship as are the lower and upper quench plenums 88. However, it is also possible for the upper rollers 52 to be located intermediate the lower rollers 42 such as disclosed by U.S. Pat. No. 6,378,339 of Thomas J. Zalesak and Alfredo Serrano, which is assigned to the assignee of the present invention and the entire disclosure of which is hereby incorporated by reference.

The lower and upper linkages 26 and 48 illustrated in FIG. 6 as previously described each has connector links 28 whose construction is best illustrated in FIG. 7. More specifically, each connector link 28 has a connector link member 126 which, as illustrated in FIGS. 9 and 10, has a forked end 128 and another end 130 that is received by the forked ends of the adjacent link member 126 in an interfitted relationship that is secured by a pivot pin 132 of the associated pivotal connection 32. Each connector link 26 also has a link tube 134 that is secured by welds 136 to the link tube 126 with an interfitted engagement 138 that rigidifies the connection. A link shaft 140 of each connector link 28 is received within the link tube 134 and has one end secured to the link member 126 by an axial connector 142 embodied by a threaded bolt. Adjacent the other end of the link tube 134, threaded adjusters 144 which are spaced at 90° degree intervals locate the link shaft 144 along axis B of the connector link.

To the left of center of the lower and upper linkages 26 and 48 as shown in FIG. 6, the connector links 28 and control links 34 have the construction illustrated in FIG. 7. More specifically, the control links 34 are mounted on the end of the link shaft 140 opposite the connector 142 and are secured by a threaded lock nut 146 with a bushing 148 spacing the control links from each other. Furthermore, each control link 34 has a pair of antifriction bearings 150 whose inner races are mounted by a reduced diameter link shaft portion 152 and whose outer races are secured to the control shaft so that the bearing elements between the races by rolling contact support the control links for their pivoting. Also, the spaced relationship of the control links 34 from the pivotal connections 32 of the adjacent connector links 28 and the parallel relationship of the axes A of pivotal connections 32 with respect to the glass sheet as well as the perpendicular relationship of the axes B of control link pivoting provides a constant radius of curvature of the bent glass sheet as previously described. In this connection, it should be noted that the extent to which the control links 34 straighten from their angular relationship shown should be limited to about 10°-15° from a straight line so that binding does not take place upon attempted reverse movement toward the more angular location as previously described in connection with FIGS. 9 and 10.

Figure 7A:
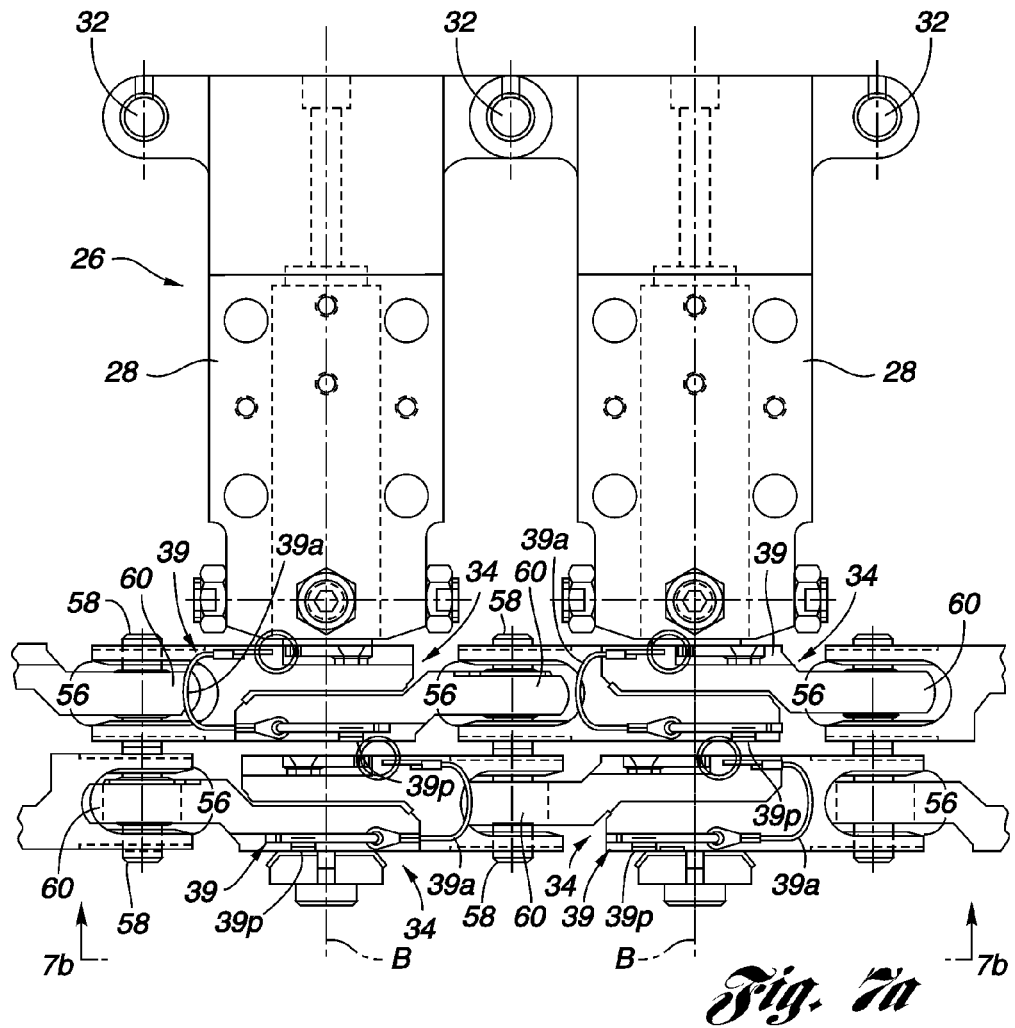
FIG. 7a is similar to FIG. 7 but illustrates the construction of connector links and control links that have detachable connections at the right side of each linkage as shown in FIG. 6.
Figure 7B:
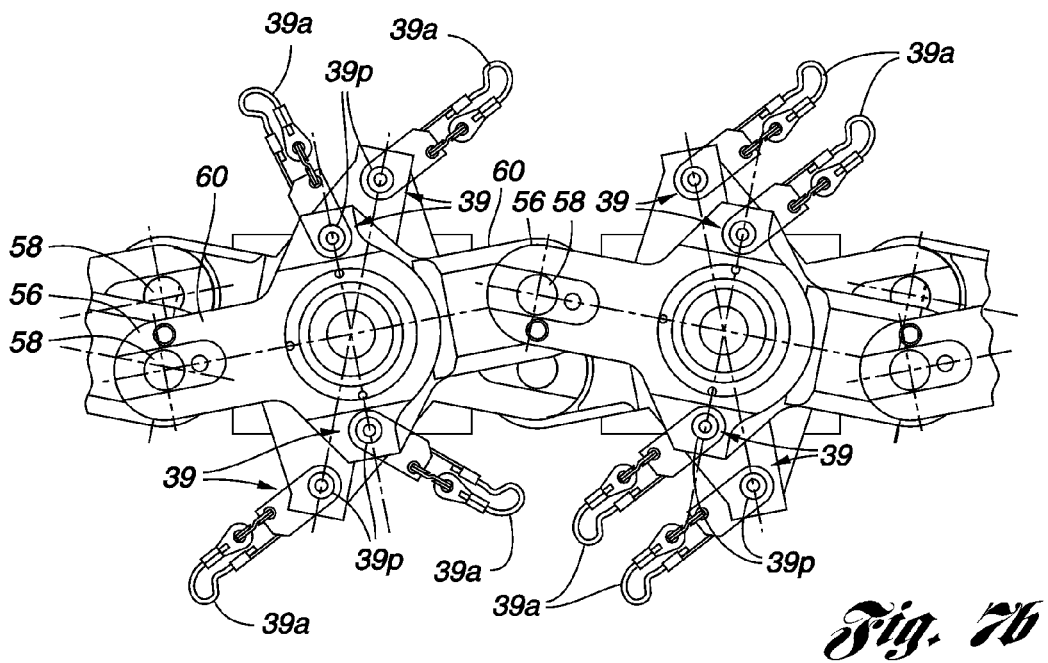
FIG. 7b is a view taken along the direction of line 7b-7b in FIG. 7a to illustrate the construction of detachable connections of the linkages at their right side as shown in FIG. 6.

At the center of the lower and upper linkages 26 and 48 shown in FIG. 6 and to the right thereof, the connection links and control links are constructed as shown in FIGS. 7a and 7b wherein the control links 34 have the detachable connections 39 whose detachment permits bending of the linkage on the right side thereof independently of the bending of the linkage on the left side thereof. More specifically, the portions of each control link 34 embodied by the forked end 56 and end 60 extend in opposite directions from the pivotal axis B thereof and are selectively attached to each other or detached from each other by pins 39p. When attached, these control links portions 56 and 60 of each control link pivot with each other to function as the control links described in connection with FIG. 7 in order to provide constant radius bending of the glass sheet. Removal of the pins 39p permit the control link ends 56 and 60 to pivot independently of each other so that bending to the right thereof can be performed independently of bending to the left thereof since the disconnected control links then do not function to coordinate the bending of the connector links 28 on the opposite sides of the disconnections. Attachment clip assemblies 39a detachably secure the opposite ends of each pin 39p extending through the holes in the two different portions of the associated control link 34 to attach the portions, while detachment of the control clip assemblies 39a permits removal of the pins 39p for the different modes of bending on the opposite sides thereof as previously described. All of the control clip assemblies 39a associated with the two control links 34 of vertically aligned pairs of the connector links 28 may be attached to each other with a key that identifies the particular location at which these control links are utilized along the linkage. Such location identification may be monitored by a suitable control panel to which the key is inserted so that the operating control of the bending station can determine the appropriate extent of bending actuation needed for that location. Before proceeding with further discussion of the different modes of bending in addition to those previously described, a discussion of the manner in which bending actuation is provided will be helpful in understanding all aspects of the bending station.

Figure 4:
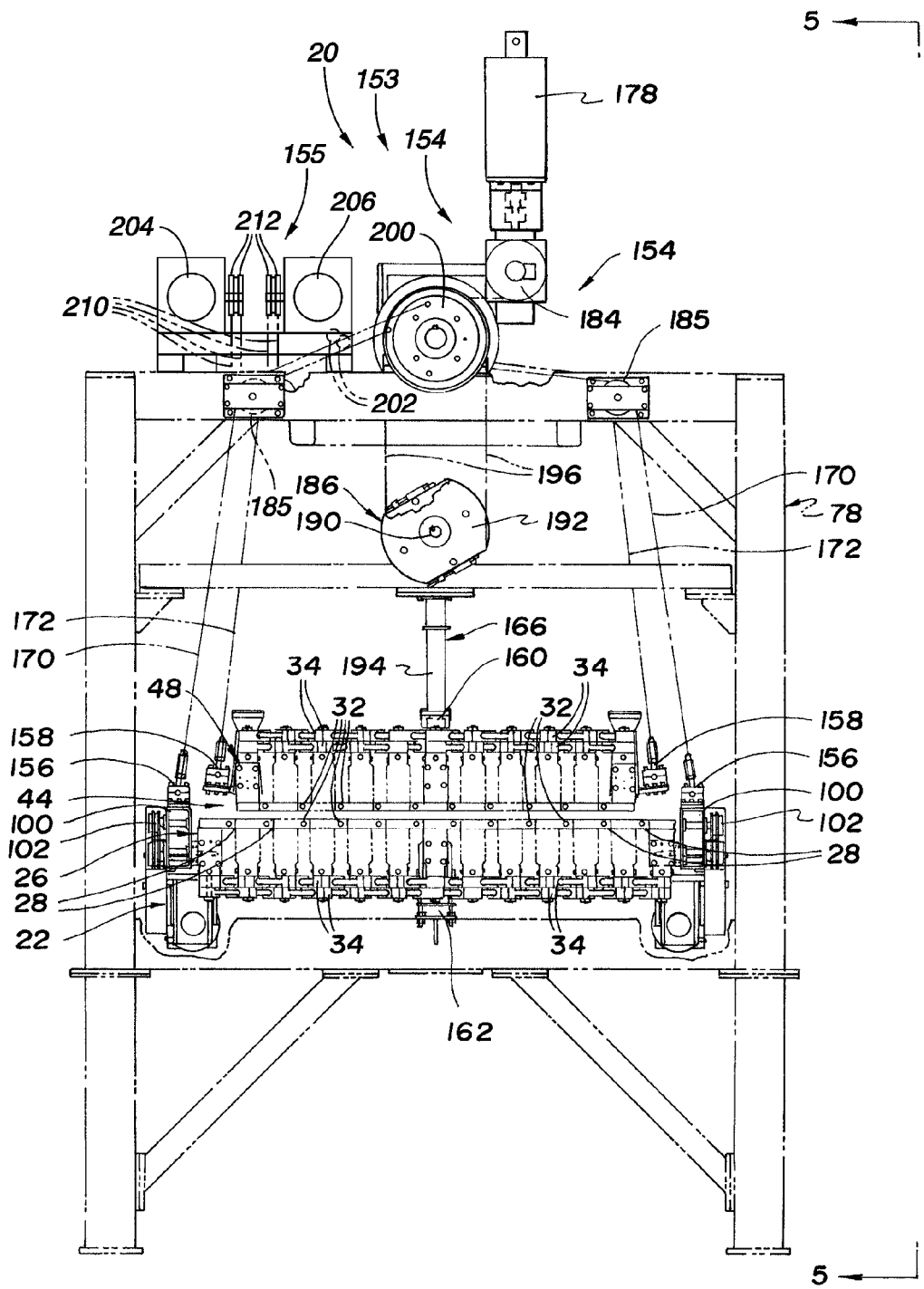
FIG. 4 is an end elevational view taken along the direction of line 4-4 in FIG. 1 and illustrates linkages and an actuating mechanism that cooperatively move the deformable molds between the flat shape and bent shapes of constant radius.
Figure 5:
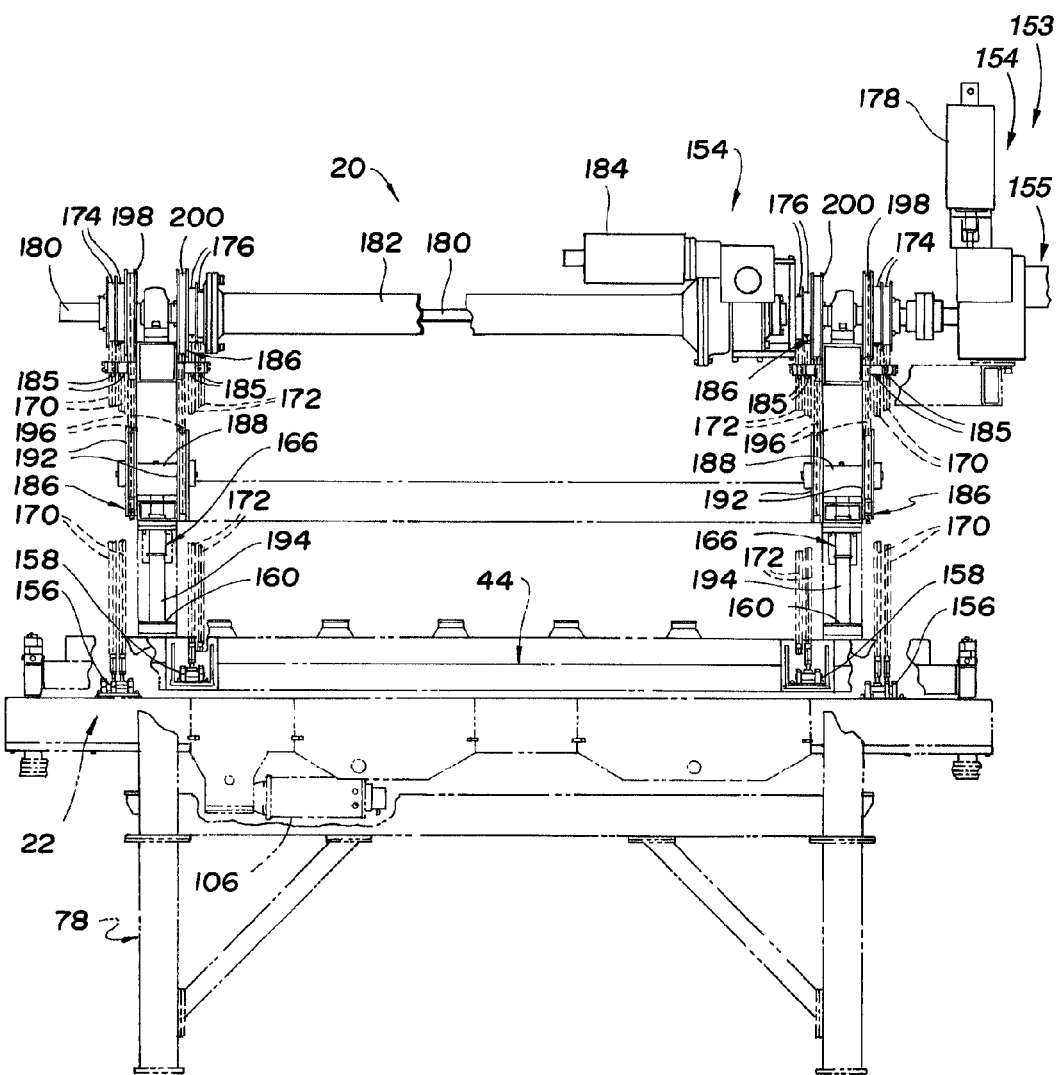
FIG. 5 is a side view taken along the direction of line 5-5 in FIG. 4 to further illustrate the construction of the actuating mechanism and the locations of the linkages that cooperatively move the lower and upper deformable molds between the flat shape and the bent shapes.

With reference to FIGS. 4 and 5, the glass sheet bending station 20 includes an actuating mechanism 153 including a primary actuating mechanism 154 and a secondary actuating mechanism 155 that are mounted on the framework 78 and selectively operable to provide different modes of the bending. The primary actuating mechanism 154 moves the lower and upper linkages 26 and 48 so that the deformable platens move between the flat shape of FIG. 2 and a constant radius bent shape as illustrated in FIG. 3 to perform the bending and is also usable to perform other bending when symmetrical about a detached connection at the center of the linkages between their ends as is hereinafter more fully described. The secondary actuating mechanism 155 is operable to perform asymmetrical bending about detached control linkage connections of the lower and upper linkages as is hereinafter more fully described. Both the primary actuating mechanism 154 and the secondary actuating mechanism 155 are schematically illustrated in FIG. 11. Operation of the secondary actuating mechanism 155 will follow an initial discussion of the operation of the primary actuating mechanism 154.

The primary actuating mechanism 154 as shown in FIGS. 4 and 5 has connections 156, 158 and 160 to the lower and upper linkages 26 and 48 to provide movement thereof to the upwardly concave shapes such as illustrated in FIG. 3 to move the mold members 24 and 46, i.e. quench tubes, and bend the glass sheet therebetween to an upwardly concave shape of a constant radius as previously described. As shown in FIG. 4, the lower linkage 26 has a fixed center connection 162 to the framework 78. This fixed center connector is provided by a suitable link extender 164 (FIG. 6) from the connector link tube 134 of the central connector link 28, with this extender having portions located on opposite sides of the associated control links 34 so as not to interrupt their pivoting as previously described. Each end of the lower linkage 26 as shown in FIG. 4 also has an associated end connection 156 to the actuating mechanism 154. Furthermore, the upper linkage 48 of the upper deformable mold has a center support 166 which includes the connection 160 of the actuating mechanism to the center of the upper linkage 48. More specifically, this center connection 160 is provided as shown in FIG. 6 to the central connector link 28 by a link extender 168 that extends around the associated control links 34 so as not to prevent their pivoting as previously described. The upper linkage 48 of the upper deformable mold also has end connections 158 to the actuating mechanism 154 as shown in FIG. 4.

As illustrated in both FIGS. 4 and 5, the primary actuating mechanism 154 includes flexible members 170 and 172 connected to the end connections 156 and 158, respectively, of the lower and upper linkages 26 and 48 of the lower and upper deformable molds. These flexible members are preferably embodied by chains. The primary actuating mechanism 154 as shown in FIGS. 5 and 11 has wheels 174 and 176 that have outer spiraling or cam surfaces receiving the flexible members 170 and 172 embodied by the chains connected to the linkage end connections 156 and 158. A first actuator 178, which is an electric motor, rotates the wheels in opposite directions as is hereinafter described to wind and unwind the flexible members 170 and 172 on their associated wheels 174 and 176 in order to move the deformable molds between the flat and bent shapes. Of course, a greater extend of rotation provides a greater amount of winding and hence bending to a greater extent from the flat shape to a shorter radius of constant curvature.

As illustrated in FIG. 11, the primary actuating mechanism 154 includes first and second rotary actuator members 180 and 182 one of which is driven by the first actuator 78, specifically the actuator member 180. A second rotary actuator 184 of the actuating mechanism connects the first and second rotary actuator members 180 and 182 and is operable to selectively prevent or provide relative rotation between these actuator members. More specifically, this second rotary actuator 184 like the first one is an electric motor and is mounted on the rotary actuator member 182 with its rotary output rotatively connected such as by belting, gearing or chain driving to the other rotary actuator member 180.

With continuing reference to FIG. 11, the wheels 174 that receive the flexible members 170 connected to the movable end connections of the lower linkage of the lower deformable mold are fixed on one of the rotary actuator members, which specifically is the one rotary actuator member 180 that is driven by the actuator 178 as previously described. The wheels 176 that receive the flexible members 172 connected to the movable end connections of the linkage of the upper deformable mold are fixed to the other rotary actuator member, which is the rotary actuator member 182 as shown. More specifically, these rotary actuator members 180 and 182 are respectively illustrated as a central shaft and a tube that receives the shaft such that the second rotary actuator 184 provides a connection between the shaft and the tube and is operable to provide the relative rotation therebetween as previously described. It should also be noted as illustrated in FIGS. 4 and 5 that the flexible members 170 and 172 extend over associated idler wheels 185 which are preferably embodied by sprockets rotatably mounted on the framework 78 so that the centrally mounted actuating mechanism 154 can be connected vertically to both ends of both of the linkages 26 and 48 by making angular bends as needed. As is hereinafter more fully describe, the idler wheels 185 on one side of the linkage centers are supported for vertical movement on the framework under the control of the secondary actuating mechanism 155. Furthermore, the linkages 26 and 48 at both ends of each deformable mold 22 and 44 have respective flexible members 170 and 172 as well as associated wheels 174 and 176 so that the linkage at each end of each deformable mold is bent in the same manner as the linkage at the other end. Likewise, there is a center support 166 supporting the center of each upper linkage 48 as is hereinafter more fully described.

As illustrated in FIG. 11, each center support 166 for the upper linkage 48 of the upper deformable mold has a wheel assembly 186 and, as shown in FIG. 4, has the previously mentioned connection 160 to the center of the upper linkage 48 that controls the bending of the upper deformable mold. More specifically, the center support 166 includes a journal 188 through which a shaft 190 extends and has a pair of wheels 192 mounted on its opposite ends, and a support member 194 depends downwardly from the journal 188 to the connection 160 shown in FIG. 4 to the center of the upper linkage as previously described. The center support 166 as best shown in FIG. 11 also has a pair of flexible members 196 preferably embodied by chains wrapped in opposite directions about the wheel assembly 186. The center support 166 also includes a pair of wheels 198 and 200 respectively mounted by the first and second rotary actuator members 180 and 182 which, as previously mentioned, are the shaft and the tube through which the shaft extends. These wheels 198 and 200 respectively receive the flexible members 196 in oppositely wrapped directions to each other.

Operation of only the first actuator 178 of primary actuating mechanism 154 as previously described moves the end connections 156 and 158 (FIG. 4) of both linkages to perform the bending of the glass sheet between the lower and upper deformable molds while the center support 166 maintains the center connection 160 of the upper linkage 48 stationary. This stationary support results from the fact that while one wheel 198 or 200 unwinds the associated flexible member 196 as shown in FIG. 11 during operation of the first actuator 178, the other wheel 198 or 200 will then wind the associated flexible member such that even though the wheels 192 may rotate, the shaft 190 remains in the same vertical position such that the support member 194 depending from its journal 188 to the upper linkage center connection 160 shown in FIG. 4 does not move. However, operation of the second rotary actuator 184 provides relative rotation between the first and second rotary actuator members 180 and 182 which moves the end connections 158 and the center connection 160 of the upper linkage 48 shown in FIG. 4 vertically to provide a change in the spacing between the lower and upper deformable molds. More specifically, the adjustment of the end connections takes place due to relative rotation between the rotary members 180 and 182 such that the flexible members 172 adjust the end connections. Furthermore, while the one wheel 198 of the center support 166 remains stationary on the first actuator member 180, the other wheel 200 of the center support 166 is rotated with the net effect being a rotation of the wheel assembly 186 and an effective winding or unwinding that changes the vertical position of the shaft 190 and its journal 188 from which the support member 194 depends to the center connection 160 (FIG. 4) of the upper linkage 48.

It should also be noted that during a bending cycle it is possible to operate both actuators 178 and 184 of primary actuating mechanism 154 at the same time. This concurrent operation of actuators 178 and 184 allows a greater spacing between the lower and upper deformable molds 22 and 44 while in the flat shape to facilitate movement of the glass sheet between the molds. Thereafter, the concurrent operation of the actuators moves the upper deformable mold 44 downwardly toward the lower deformable mold 22 as the bending is performed. Of course, the second actuator 184 should terminate operation after the upper deformable mold 44 has moved downwardly toward the lower deformable mold 22 into a spaced relationship approximately equal to the glass sheet thickness. During movement back to the flat shape in preparation for the next cycle, operation of both actuators 178 and 184 moves the upper deformable mold 44 upwardly away from the lower deformable mold 22 into the farther spaced relationship from which the bending begins. This operation allows the opposed deformable molds 22 and 44 to be initially spaced from each other a greater thickness than the thickness of the glass sheet and to thereafter simultaneously bend the deformable molds and move the molds toward each other such that both molds engage the glass sheet to provide its bending. The deformable molds may then provide the quenching gas as previously described to quench the bent glass sheet. Furthermore, the deformable mold 22 is located below the deformable mold 44 in a lower and upper arrangement with the lower deformable mold 22 functioning as a conveyor as previously described, and the molds are bent to upwardly concave shapes as they are simultaneously moved toward each other with the upper deformable mold 44 being moved downwardly to provide the movement of the molds toward each other. Also, it should be appreciated that this mold movement toward each other at the ends of the linkages is a relative movement in that the upper linkage ends move upwardly slower than the lower linkage ends as the bending is performed with both rotary actuators 178 and 184 operating the actuating mechanism as described above.

Figure 11A:
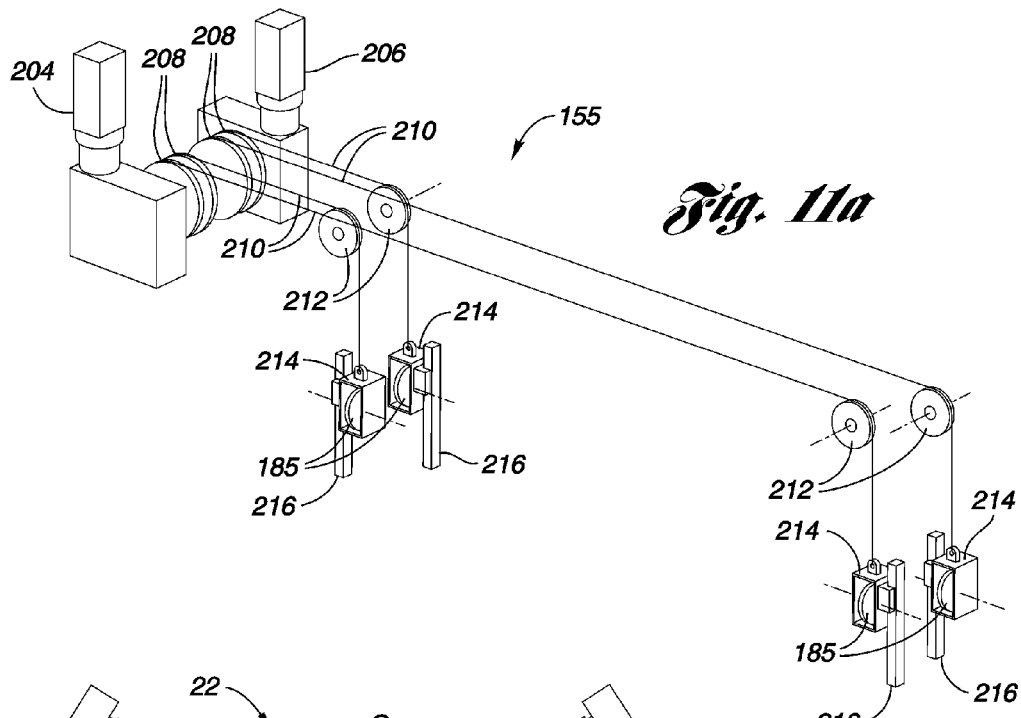
FIG. 11a is a perspective view that further illustrates the secondary actuating mechanism.
Figure 11B:
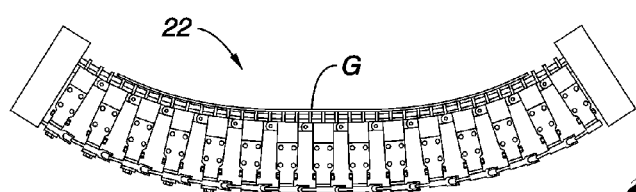
FIG. 11b is a view illustrating just the lower linkage and shown performing bending with a constant radius of curvature as illustrated also in FIG. 3.
Figure 11C:
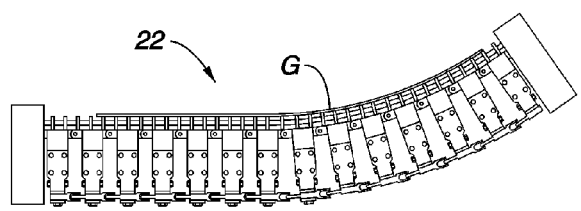
FIG. 11c is a view similar to FIG. 11b but showing the lower linkage bent with two different radii of constant curvature.

As illustrated in FIGS. 11 and 11a, the secondary actuating mechanism 155 is illustrated as operating on one side of the bending station and is operable to provide glass sheet bending on one side of detached linkage connections from any bending on the other side of the detached connections so that the bending can be other than with just a constant radius of curvature as shown in FIG. 11b. For example, the bending may be with two different areas of constant curvature as shown in FIG. 11c, with a J-shaped bend having a straight portion and a curved portion of constant radius as shown in FIG. 11d, or with a V curvature as shown in FIG. 11e.

As shown in FIG. 11, the secondary actuating mechanism 155 has connections to the wheels 185 of the first actuating mechanism 154 on one lateral side of the bending station. Flexible members 170 and 172 of the first actuating mechanism 154 extend to these wheels 185 controlled by the second actuating mechanism 155 and downwardly to the linkage ends as previously described. Furthermore, the flexible members 170 and 172 each extend below a wheel 202 (e.g. chain sprocket) that is mounted for rotation on the framework in any suitable manner. Vertical upward movement of the wheels 185 by the secondary actuating mechanism 155 causes the flexible members 170 and 172 to extend downwardly to the fixed wheels 202 and then upwardly to the wheels 185 so as to provide upward movement of the associated linkage ends on one side of the bending station independently of any linkage movement on the other side of the bending station. It will be remembered that this is possible due to the detached control link connections previously described.

As illustrated in FIG. 11a, the secondary actuating mechanism is disclosed as including a pair of electric actuator motors 204 and 206 each of which drives a pair of wheels or sprockets 208 from which flexible members embodied by chains 210 extend. These chains 210 extend to wheels or sprockets 212 that extend downwardly to vertically movable housings 214 on which the wheels 185 are rotatably supported on one side of the bending station. It will be recalled from the above description of FIG. 11 that these wheels 185 support the flexible members or chains 170 and 172 that extend from the primary actuating mechanism 154 and downwardly to the associated linkage ends. Each of the vertically movable housings 214 is supported on the framework by an associated antifriction linear bearing 216 as shown in FIG. 11a. In order to reduce any chain stretching, portions of the flexible chains 210 that do not bend around wheels or sprockets 208 or 212 may be solid rods supported by slideways on the framework.

One of the electric motors 204 provides vertical movement of the wheels 185 associated with the lower linkage on one side of the bending station, and operation of the other electric motor 206 provides vertical movement of the wheels 185 associated with the upper linkage on the one side of the bending station.

As previously discussed, the primary actuating mechanism 154 is operated with all of the control links 34 connected in order to provide constant radius bending of the glass sheet such as illustrated in FIG. 3 and FIG. 11b. Disconnecting one of the sets of control links 34 associated with vertically aligned connector links 28 of the lower and upper linkages such as shown in FIG. 6 allows different vertical movements on each side thereof while the other connected control links provide constant radius bending on each side of the disconnected control links, the result being two different constant radii of curvature of shown in FIG. 11c. More specifically, both the primary and secondary actuating mechanisms 154 and 155 are operated with the net result being there is greate upward movement of the linkage ends and bending on the one lateral side of the bending station where the secondary actuating mechanism provides additional upward movement of the adjacent linkage ends.

Figure 3A:
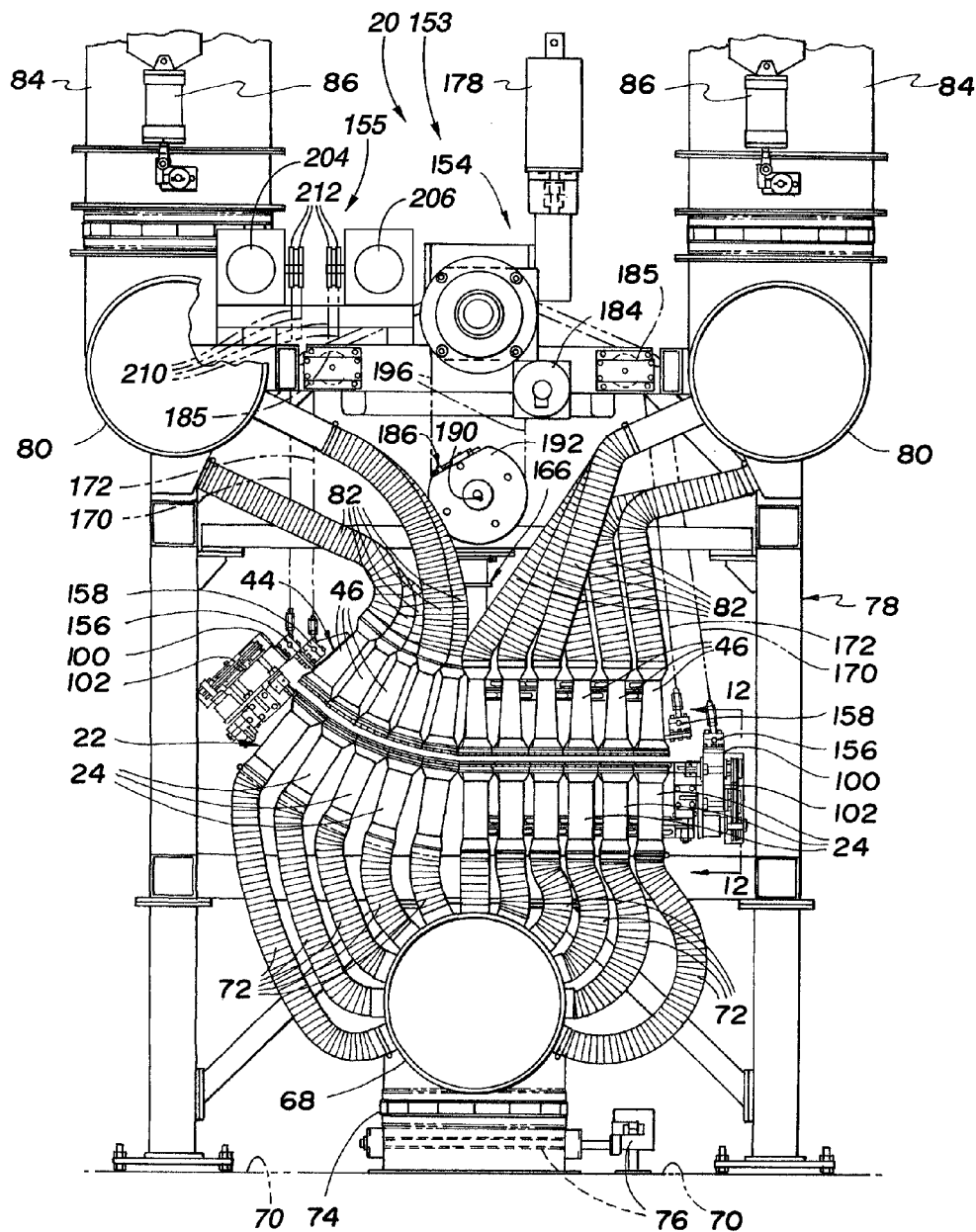
FIG. 3a is a view similar to FIG. 3 but shown with the molds performing an asymmetrical bend of a J shape.
Figure 11D:
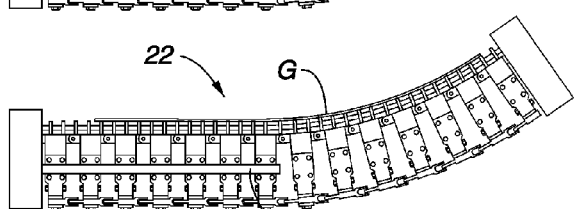

As illustrated in FIGS. 3a and 11d, it is also possible to provide J bends which can be performed by operation of only the secondary actuating mechanism to move the one end of the linkage upwardly while its other end remains stationary at the other side of the detached control links. To ensure planarity, it is also possible to utilize a lock member 218 which may have different constructions extending between fixed connections to certain connector links to prevent pivotal movement therebetween about their connected pivotal axes. It is also possible to have a tubular member 220 preventing such bending by mounting thereof on the mold members 46 as shown in FIG. 14 for insertion of the lock member 218 of an appropriate length. Regardless of the construction utilized, the lock member will ensure flatness on the straight portion of the J bend.

Figure 11E:
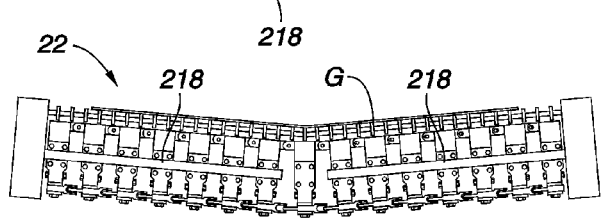
FIG. 11e is a further view similar to FIG. 11b but showing the lower linkage bent to a shallow V shape.

The bending station can also be utilized to provide V bends as shown in FIG. 11e. Such bends require a pair of lock members 218 located on opposite sides of detached control links. When the control link detachment is at the center of the linkages, it is possible to perform the V bending utilizing operation of only the primary actuating mechanism 154. For other V bends where the detached linkages cannot be located at the linkage center between its ends, only the secondary actuating mechanism is operated to perform the V bending since the center of the lower linkage is fixed with respect to the framework.

The extent to which the primary and secondary actuating mechanisms 154 and 155 are operated for any given bend depends upon the bend shape, the extent of the bending, and the location of the detached control links along the linkages.

It should be appreciated that for dedicated machines that only operate a single glass sheet bending shape, the detachable connections of the linkages can remain detached throughout the use of the machine without the need for any control links at the linkage locations where the secondary actuating mechanism functions either by itself or with the primary actuating mechanism on one side independently of the linkage movement and any glass sheet bending on the other side. However, for most machines, it is preferable for the detachable connections to have the control links which can be attached and detached. Likewise, the construction of the primary actuating mechanism 154 and the secondary actuating mechanism 155 can be modified although the construction shown is preferred due to the simplicity of operation and construction.

Thus, while the best mode for carrying out the invention has been described in detail, those familiar with the art to which this invention relates will recognize various alternative designs and embodiments for practicing the invention as defined by the following claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A glass sheet bending station for bending heated glass sheets, the bending station comprising:
   a framework;
   lower and upper deformable molds for receiving therebetween a glass sheet to be bent;
   lower and upper linkages that respectively support the lower and upper deformable molds on the framework and that are configured to respectively control movement of the lower and upper deformable molds from a first shape to a second bent shape, each linkage including connector links that are connected to the associated deformable mold and that each have a pivotal connection to another one of the connector links, wherein the pivotal connections define pivot axes that are parallel to a shape defined by the connector links between the lower and upper linkages throughout the bending, each linkage also having control links that have respective pivotal connections to the connector links thereof such that the control links are pivotable about axes that extend perpendicular to the shape defined between the lower and upper linkages throughout the bending, wherein at least one of the control links of each linkage is configured to allow relative movement between portions of the at least one control link to permit glass sheet bending by linkage movement on one side thereof independently of the other side thereof; and
   an actuating mechanism that is operable to move each linkage on the one side of the associated at least one control link to provide bending of the glass sheet independently of the other side of the at least one control link.

2. The glass sheet bending station of claim 1 wherein the actuating mechanism is further operable to move each linkage on each side of the associated at least one control link such that the linkages move the deformable molds to bend the glass sheet.

3. The glass sheet bending station of claim 1 wherein the deformable molds are configured to bend at least one end of the glass sheet upwardly.

4. The glass sheet bending station of claim 1 wherein the deformable molds are configured to bend at least a portion of the glass sheet with a constant radius of curvature.

5. The glass sheet bending station of claim 1 wherein the at least one control link of each linkage includes at least one detachable connection that is detachable to allow the relative movement between the portions of the at least one control link.

6. The glass sheet bending station of claim 1 wherein the actuating mechanism is operable to move the linkages such that the linkages move the deformable molds to bend the glass sheet with a constant radius of curvature.

7. The glass sheet bending station of claim 1 wherein the linkages are configured such that the shape defined by the connector links between the lower and upper deformable molds has a constant radius of curvature during the bending.

8. The glass sheet bending station of claim 1 wherein the molds and the linkages are configured to bend the glass sheet such that the glass sheet does not have a constant radius of curvature.

9. The glass sheet bending station of claim 1 wherein the actuating mechanism includes a primary actuating mechanism and a secondary actuating mechanism, wherein the primary actuating mechanism is operable to perform symmetrical bending of the glass sheet, and wherein the secondary actuating mechanism is operable to perform asymmetrical bending of the glass sheet about the at least one control link of each linkage.

10. The glass sheet bending station of claim 1 wherein each of the deformable molds includes a plurality of elongated mold members, and a plurality of rotatable elements supported by the mold members.

11. The glass sheet bending station of claim 1 wherein the deformable molds are configured to receive the glass sheet in a flat condition.

12. A glass sheet bending station for bending heated glass sheets, the bending station comprising:
    a framework;
    lower and upper deformable molds that each include a plurality of elongated mold members and a plurality of rotatable elements supported by the mold members for receiving a flat glass sheet to be bent;
    lower and upper linkages that respectively support the lower and upper deformable molds on the framework and that are configured to respectively control movement of the lower and upper deformable molds from a first shape to a second bent shape, each linkage including connector links that are fixedly connected to the associated mold members and that each have a pivotal connection to another one of the connector links, wherein the pivotal connections define pivot axes that are parallel to a shape defined by the connector links between the lower and upper linkages throughout the bending, each linkage also having control links that have respective pivotal connections to the connector links thereof such that the control links are pivotable about axes that extend perpendicular to the shape defined between the lower and upper linkages throughout the bending, wherein at least one of the control links of each linkage is configured to allow relative movement between portions of the at least one control link to permit glass sheet bending by linkage movement on one side thereof independently of the other side thereof;

a primary actuating mechanism that is operable to move the linkages such that the connector links of each linkage move from a flat shape to a curved shape that defines a constant radius to perform symmetrical bending of the glass sheet; and a secondary actuating mechanism that is operable to move each linkage on the one side of the associated at least one control link to provide bending of the glass sheet independently of the other side of the at least one control link to perform asymmetrical bending of the glass sheet about the at least one control link of each linkage.

13. The glass sheet bending station of claim 1 wherein, for each linkage, the connector links are fixedly connected to the associated deformable mold.

\* \* \* \* \*